(12) United States Patent
Frankkila (10) Patent No.: US 8,189,616 B2
(45) Date of Patent: May 29, 2012

(54) DIVIDING RTCP BANDWIDTH BETWEEN COMPOUND AND NON-COMPOUND RTCP PACKETS

(75) Inventor: Tomas Frankkila, Luleå (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 141 days.

(21) Appl. No.: 12/523,676

(22) PCT Filed: Dec. 14, 2007

(86) PCT No.: PCT/SE2007/051001
§ 371 (c)(1),
(2), (4) Date: Jul. 17, 2009

(87) PCT Pub. No.: WO2008/088262
PCT Pub. Date: Jul. 24, 2008

(65) Prior Publication Data
US 2010/0020713 A1    Jan. 28, 2010

Related U.S. Application Data

(60) Provisional application No. 60/885,476, filed on Jan. 18, 2007.

(51) Int. Cl.
*H04J 3/16* (2006.01)
*H04J 3/22* (2006.01)
*H04J 3/06* (2006.01)
*H04J 3/18* (2006.01)

(52) U.S. Cl. .......... 370/465; 370/477; 370/516

(58) Field of Classification Search .......... None
See application file for complete search history.

(56) References Cited

U.S. PATENT DOCUMENTS

2005/0005020 A1* 1/2005 Rey et al. ............ 709/231
2009/0021572 A1* 1/2009 Garudadri et al. ........ 348/14.01
2010/0135290 A1* 6/2010 Curcio .................... 370/389

OTHER PUBLICATIONS

Garudadri et al, "Rate Adaptation for Video Telephony in 3G Networks", this paper appears in: Packet Video 2007; Issue Date: Nov. 12-13, 2007; pp. 342-348.*

* cited by examiner

*Primary Examiner* — Xavier Szewai Wong (57) ABSTRACT

An apparatus for controlling utilization of RTCP bandwidth for compound and non-compound RTCP packets is described. This apparatus includes a bandwidth detector determining available RTCP bandwidth and a channel quality detector determining channel quality. A bandwidth divider connected to the bandwidth detector and the channel quality detector divides the available RTCP bandwidth between compound and non-compound RTCP packets based on the determined channel quality.

10 Claims, 8 Drawing Sheets

DIVIDING RTCP BANDWIDTH BETWEEN COMPOUND AND NON-COMPOUND RTCP PACKETS

This application claims the benefit of U.S. Provisional Application No. 60/885,476, filed Jan. 18, 2007, the disclosure of which is fully incorporated herein by reference.

TECHNICAL FIELD

The present invention relates to controlling utilization of RTCP (Real Time Control Protocol) bandwidth for compound and non-compound RTCP packets.

BACKGROUND

Real-time applications that transport media frames over the Internet almost always use the Real-Time Protocol (RTP), [1]. The media frames are encapsulate into RTP packets and transmitted to the other user(s). The RTP protocol also defines a control protocol, the Real-Time Control Protocol (RTCP). RTCP provides functionality that is related to the media flow, for example:

Quality feedback, for example packet loss rate and interarrival jitter. The feedback may be used to adapt the transmission of the media.

Information needed for synchronization between different media, for example to achieve and maintain lip-sync between speech and video.

Source Description (SDES), which identifies the media sender.

Application-specific signaling (APP), which can be any kind of signaling and does not need to be standardized. RTCP is constructed in such a way that receivers that don't understand the RTCP-APP packet can discard it and continue parsing the remaining part(s) of the RTCP packet.

Sending RTCP packets requires some bandwidth. This bandwidth is regarded as 'overhead' since these packets are sent in addition to the media packets. To ensure that the overhead is kept small enough, in relation to the media bandwidth, a limit for the RTCP bandwidth is often defined at session setup. A normal definition is to allow 2.5% to 5% of the bandwidth to be used for RTCP.

Traditional RTCP packets, so called compound RTCP packets, are fairly large because it is required that an RTCP packet must contain either a Sender Report or a Receiver Report as well as SDES, even if the intention is to send only the APP packet. This means that such packets can only be transmitted quite infrequently, often less than once per second. A solution is, however, being discussed in IETF (Internet Engineering Task Force), see [2], where one allows sending of only APP packets in so called non-compound RTCP packets. With non-compound RTCP packets, the packet size is significantly reduced.

For Multimedia Telephony, it has been decided that RTCP-APP packets shall be used for sending adaptation signaling for voice. The adaptation signaling may suggest: changing the codec mode; packing more or fewer frames into one packet; or adding or removing application layer redundancy, possibly with an offset.

RTCP packets are often quite large, significantly larger than normal voice packets. For example, one VoIP (Voice over IP) packet with AMR122 (AMR=Adaptive Multi-Rate) encoded media is about 72 bytes without header compression and typically about 35 bytes when header compression is applied. Compound RTCP packets are typically in the order of 100-140 bytes without header compression and 80-120 bytes with header compression. Non-compound RTCP packets are significantly smaller. A non-compound RTCP packet with only APP is in the order of 50 bytes without header compression and about 30 bytes with header compression.

SUMMARY

For some systems, for example HSPA (High-Speed Packet Access), the smaller size of the non-compound RTCP packets means that the likelihood that a packet can be properly received even for bad channel conditions increases. This is especially useful for transmitting adaptation requests, since the adaptation becomes more and more important as the channel degrades. The size of the RTCP packets therefore determines how well the adaptation will perform. Another advantage with small packets is that adaptation signaling can be transmitted more frequently, given that the allowed bandwidth for RTCP is constant, which further enhances the adaptation performance. It is therefore desirable to send as many non-compound RTCP packets as possible.

On the other hand, compound RTCP packets are required, for example, for synchronization between media and for identifying the media transmitter when new participants enter the session. Sending few compound RTCP packets means that synchronization can be performed less frequently, which means that the play-out times for the respective media may diverge quite a lot before the synchronization information is transmitted. This reduces the perceived quality and gives, for example, lip-sync problems. Sending few compound RTCP packets also means that it will take a long time before the media transmitter is identified when a new participant enters the session. To enhance these functionalities, it is desirable to send as many compound RTCP packets as possible. However, the larger size of the compound RTCP packets leads to several problems:

Each transmission block will be as large as the RLC (Radio Link Protocol) protocol allows, which is significantly larger than the VoIP packets, at least when header compression is used for the media packets. This means that compound RTCP packets will use a weaker channel code and/or modulation which means that the likelihood for block errors is increased.

For systems like HSPA, the packets will be segmented over several RLC transmission blocks. This means that the packet loss rate increases even further, since several transmission blocks must be received properly before the RTCP packet can be reconstructed.

Thus, there is a conflict between sending as much non-compound RTCP packets as possible and sending as much compound RTCP packets as possible. Furthermore, optimizing for either one of the compound or non-compound RTCP packet types implicitly means starvation of the other RTCP packet type, since the limited available RTCP bandwidth has to be used by both packet types.

An object of the present invention is to better utilize the available RTCP bandwidth for compound and non-compound RTCP packets.

This object is achieved in accordance with the attached claims.

Briefly, the present invention achieves the above object by determining available RTCP bandwidth, determining channel quality, and dividing the available RTCP bandwidth between compound and non-compound RTCP packets based on the determined channel quality.

BRIEF DESCRIPTION OF THE DRAWINGS

The invention, together with further objects and advantages thereof, may best be understood by making reference to the following description taken together with the accompanying drawings, in which.

DETAILED DESCRIPTION

In the following description the same reference designations will be used for elements performing the same or similar functions.

Figure 1:
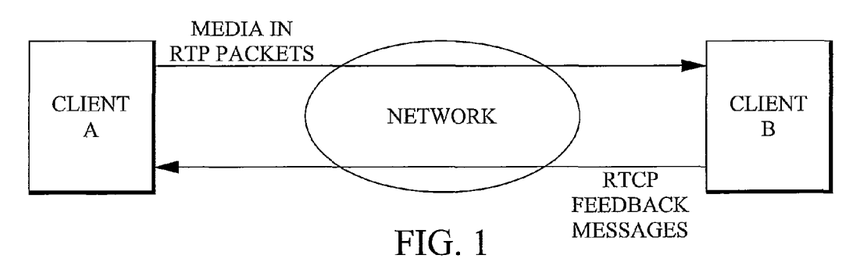
FIG. 1 is a simple block diagram giving a system overview of a network.

FIG. 1 is a simple block diagram giving a system overview of a network. Media is transmitted from client A to client B. The media is encapsulated into RTP packets. The media can be of different forms, such as speech, audio, video, text or something else. Client B sends feedback to client A using RTCP. The normal feedback, which most existing clients send, is quality feedback consisting of packet loss rate (PLR) and inter-arrival jitter (hereafter simply referred to as jitter). It is also possible to define application specific feedback information. PLR and jitter is transmitted with (normal) RTCP Receiver Reports (RTCP RR). Application specific feedback is transmitted with APP packets.

The feedback information is used by client A in order to choose how to adapt the rate of the transmitted media so that the quality can be optimized for different channel conditions (different network congestion levels). For example, if the packet loss rate is high, which is an indication that the network is congested, client A may choose to reduce the bit rate. Other adaptation possibilities are to reduce the transmitted packet rate, by sending several frames in each RTP packet, or to add error resilience to the transmitted media.

The feedback information may either be measurements, such as PLR and jitter, or direct adaptation requests, for example "switch to a lower codec rate". For MTSI (Multimedia Telephony Service for IMS (IP Multimedia Subsystem)), see [3], it has been decided to send adaptation requests instead of metrics when the media is speech (However, it is still allowed to send the PLR and jitter metrics. These metrics are typically only used for performance monitoring, but there is nothing that forbids using this info also for adaptation. However, normally one should use the adaptation requests for adapting the media).

Compound RTCP packets (also referred to as compound RTCP messages) typically contain several 'RTCP packets':

At least one Sender Report (SR) or a Receiver Report (RR):
Sender Reports include reception feedback from clients that are active senders.
Receiver Reports include reception feedback from clients that are not active senders.

SDES packets that identify the media sender (name, e-mail address, phone number, etc.).

APP packets that include application specific information which is not defined in the RTP specification. RTCP is constructed so that a receiver of an RTCP packet can skip the APP packet if it does not understand it.

Rules in the RTP specification define that a compound RTCP packet must include: either SR or RR; and SDES. APP packet(s) are optional.

A non-compound RTCP packet may contain only the APP packet.

For a more complete description of RTCP, see [1].

Figure 2:
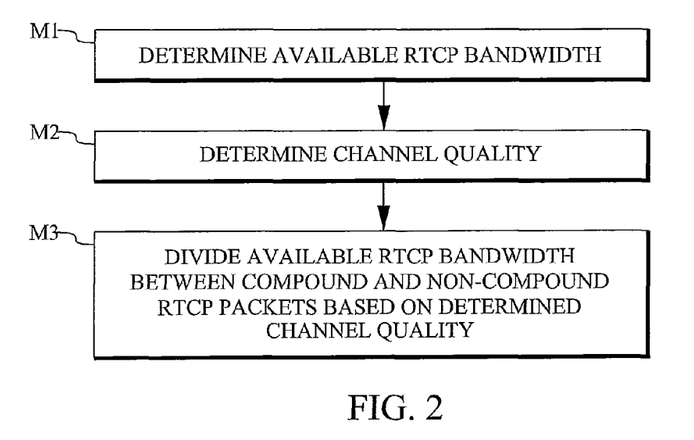
FIG. 2 is a simple flow chart summarizing the method in accordance with the present invention.

FIG. 2 is a simple flow chart summarizing the method in accordance with the present invention. Method step M1 determines the available RTCP bandwidth, step M2 determines the current channel quality, and step M3 divides the available RTCP bandwidth between compound and non-compound RTCP packets based on the determined channel quality.

Figure 3:
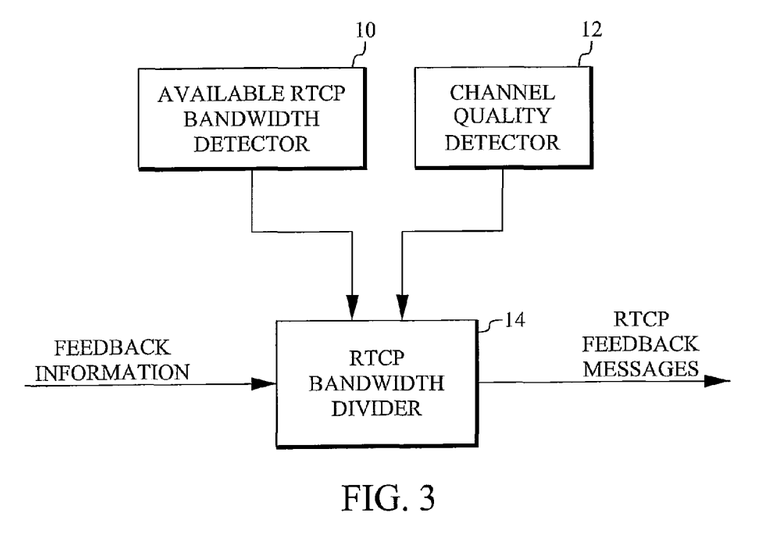
FIG. 3 is a simple block diagram illustrating the apparatus in accordance with the present invention.

FIG. 3 is a simple block diagram illustrating the apparatus in accordance with the present invention. A detector 10 detects the available RTCP bandwidth. A detector 12 detects the channel quality. These two parameters are used by an RTCP bandwidth divider 14 to divide the available RTCP bandwidth between compound and non-compound RTCP packets. This division will depend on the channel quality, as will be described in further detail below.

The described method and apparatus may be used in the following way:

When the channel conditions are good, more bandwidth is allocated to normal compound RTCP packets and less bandwidth is allocated to non-compound RTCP packets. This will maintain, for example, synchronization between media and reduces the delay before a media sender is identified. The large size of the RTCP packets, however, reduces the number of packets that can be sent since the packets are larger, which means that transmission adaptation can be done less frequently. On the other hand, adaptation is less important when the channel conditions are good.

When the channel quality degrades, more bandwidth is allocated to non-compound RTCP packets, thus increasing the likelihood that these packets are properly received. This also allows for sending more frequent adaptation requests. This will probably hurt, for example, synchronization. However, in this situation transmission adaptation is deemed more important than other performance properties in order to maintain a good media quality.

Figure 4:
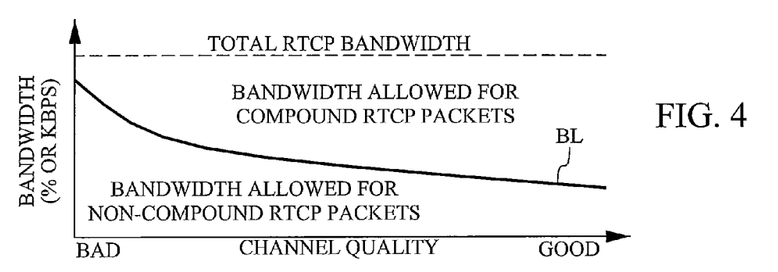
FIG. 4 is a diagram of a strategy for dividing available RTCP bandwidth between compound and non-compound RTCP packets.

FIG. 4 is a diagram of a strategy for dividing available RTCP bandwidth between compound and non-compound RTCP packets. In this example the allowed bandwidth for non-compound RTCP packets is high for bad channel conditions and low for compound RTCP packets. As the channel quality increases this situation is reversed in a continuous manner. The borderline BL between the two areas is a function that varies (in the example it decreases) from a bad channel quality to a good channel quality. It is noted that the sum of allowed bandwidths for both types of packets is constant (the dashed line). The function may be represented by a mathematical expression involving channel quality or by a lookup table.

Figure 5:
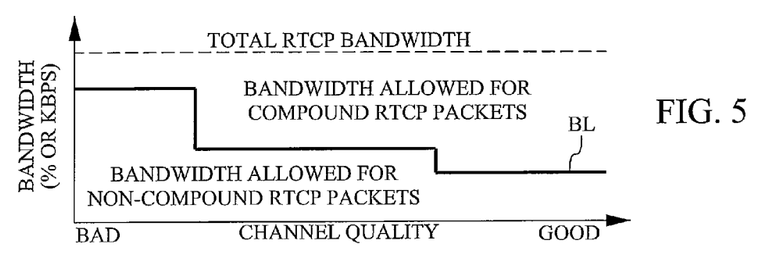
FIG. 5 is a diagram of another strategy for dividing available RTCP bandwidth between compound and non-compound RTCP packets.

FIG. 5 is a diagram of another strategy for dividing available RTCP bandwidth between compound and non-compound RTCP packets. In this example the borderline BL between the two areas is a piecewise constant function that decreases from a bad channel quality to a good channel quality. Typically such a piecewise constant function is represented by a lookup table.

Channel conditions or channel quality can be measured in several ways. Examples of suitable measures are: C/I (Channel-to-Interference ratio), C/N (Channel-to-Noise ratio), CQI (Channel quality Indicator, used in HSPA), PLR (Packet Loss Rate) and jitter. It is also feasible to combine several of these measures into a composite measure.

The strategy for dividing available RTCP bandwidth between compound and non-compound RTCP packets is determined by analyzing statistics on throughput for the two packet types for different channel conditions. This can be done either on a real or simulated system. Once this strategy (corresponding to the curves in FIGS. 4 and 5) has been determined, the allowed bandwidths for the two packet types as functions of channel quality have also been determined.

The principles outlined above are implemented in the RTCP transmitter, which is a part of a client. The idea can be implemented in several ways, some of which will be described in more detail below.

In one embodiment transmission intervals for compound and non-compound RTCP packets, respectively, are determined in advance, i.e. at session setup or when the session is modified. In general, this embodiment follows the steps outlined below:

1 The RTCP transmitter receives information related to the total available RTCP bandwidth.
2 Given the total available RTCP bandwidth and given how the bandwidth should be divided (determined by the channel quality) between compound and non-compound RTCP packets, the RTCP transmitter determines transmission interval functions for compound and non-compound RTCP packets, respectively. The transmission interval functions depend on the channel quality. One example is:
  a. If the channel quality is better than X then: the transmission interval for compound RTCP packets is set to 1 second and the transmission interval for non-compound RTCP packets is set to 0.333 seconds.
  b. If the channel quality is worse than X then: the transmission interval for compound RTCP packets is set to 2 seconds and the transmission interval for non-compound RTCP packets is set to 0.1 seconds.
3 The RTCP transmitter receives information related to the current channel quality.
4 The RTCP transmitter generates compound and non-compound RTCP packets according to the determined interval functions and the current channel quality as given in the steps above. Given the same example as above, the transmitter would send:
  a. When the channel quality is better than X then it sends one compound RTCP packet every second and 2 non-compound RTCP packets in-between.
  b. When the channel quality is worse than X then it sends one compound RTCP packets every other second and 19 non-compound RTCP packets in-between.

Figure 6:
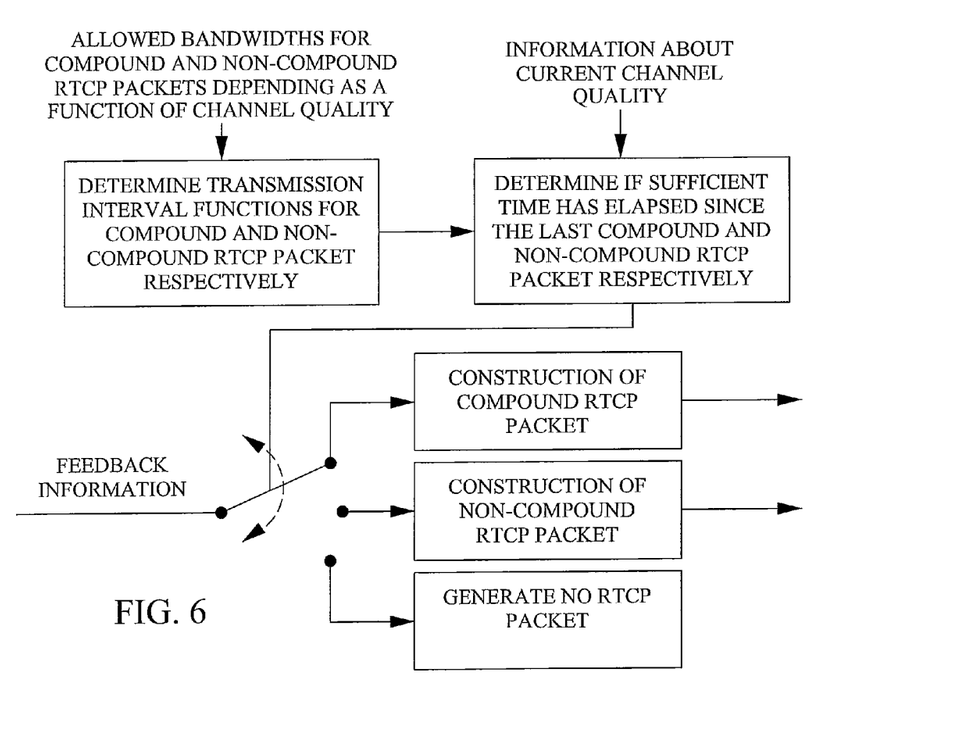
FIG. 6 is schematic overview of an embodiment of the present invention.

A schematic overview of this variant is given in FIG. 6.

Note that a compound RTCP packet also may include the information (an APP packet) included in a non-compound RTCP packet, which means that a compound RTCP packet would replace a non-compound RTCP packet in the given example. This is a consequence of the fact that the transmission interval between compound RTCP packets happens to be a multiple of the transmission interval between non-compound RTCP packets. This is, however, not a necessary feature.

Figure 7:
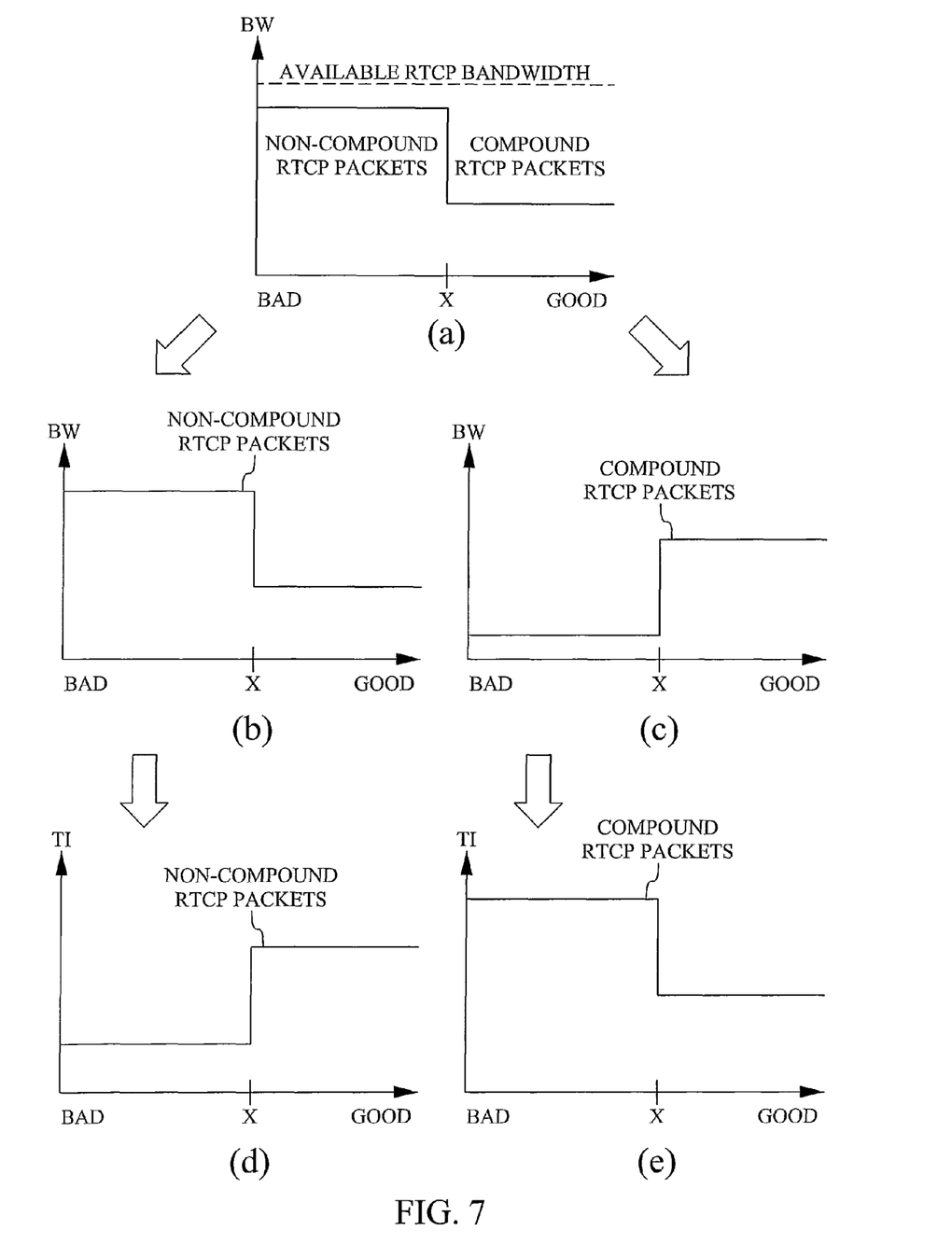
FIG. 7 is sequence of diagrams illustrating the principles of an embodiment of the method in accordance with the present invention.

FIG. 7 is sequence of diagrams illustrating the principles of this embodiment of the method in accordance with the present invention. FIG. 7(a) illustrates the division of available RTCP bandwidth between compound and non-compound RTCP packets for a simple piecewise constant function of channel quality having a single transition point X. This division results in the two bandwidth functions (of channel quality) illustrated in FIGS. 7(b) and 7(c). FIGS. 7(d) and 7(e) illustrate the corresponding transmission interval functions (these are essentially inverted bandwidth functions). In FIG. 7 BW=bandwidth and TI=Transmission Interval.

Figure 8:
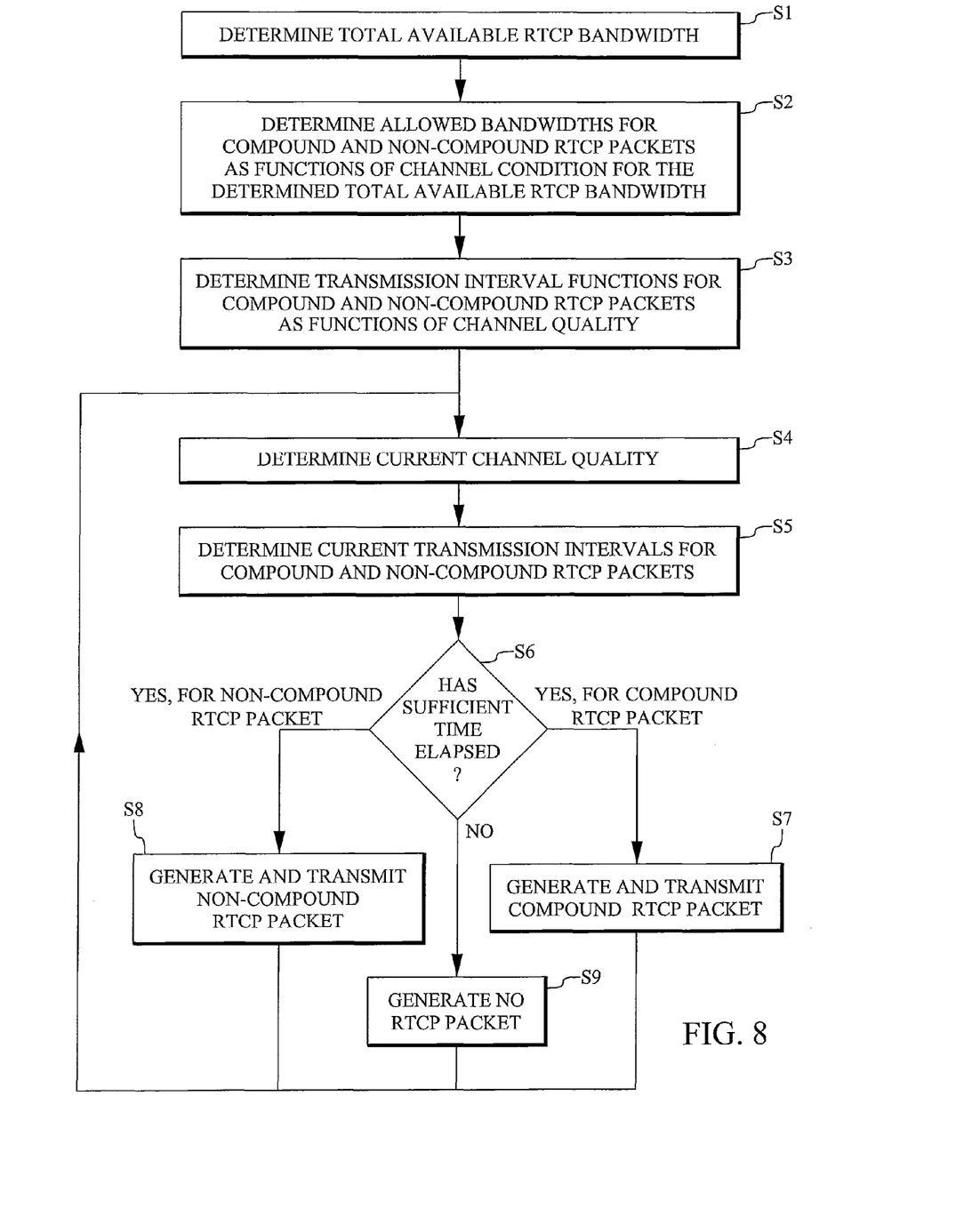
FIG. 8 is a flow chart illustrating an embodiment of the method in accordance with the present invention.

FIG. 8 is a flow chart illustrating the transmission interval function based embodiment of the method in accordance with the present invention. Step S1 determines the total available RTCP bandwidth. This is used to determine the allowed bandwidths of compound and non-compound RTCP packets as functions of channel quality in step S2. The proportions between the allowed bandwidths are typically independent of the total available RTCP bandwidth. However, in some applications it may be desirable to let these proportions depend on the total available RTCP bandwidth. For example, it may be desirable to increase the percentage of allowed bandwidth for compound packets (and decrease the percentage of allowed bandwidth for non-compound RTCP packets) for a high total available RTCP bandwidth as compared to a low total available RTCP bandwidth. Step S3 determines the transmission interval functions for compound and non-compound RTCP packets as functions of channel quality. Step S4 determines the current channel quality, which is used in step S5 to determine the current transmission intervals from the transmission interval functions. Step S6 tests (using the current transmission intervals) whether sufficient time has elapsed since the last RTCP packet was sent to allow sending of another RTCP packet. First it tests whether sufficient time has elapsed to allow sending of a compound RTCP packet. If so, a compound RTCP packet is generated and transmitted in step S7. Otherwise it tests whether sufficient time has elapsed to allow sending of a non-compound RTCP packet. If so, a non-compound RTCP packet is generated and transmitted in step S8. If neither test is successful, the transmission of packets is delayed and no RTCP packet is generated in step S9. After performing one of steps S7, S8 and S9 the procedure returns to step S4.

Since the transmission interval functions are the functions of interest in this embodiment, steps S2 and S3 may be implemented as a single step that obtains the transmission interval functions directly from the channel quality and total available RTCP bandwidth.

In FIG. 8 there is a loop back to step S4 that determines the current channel quality. This assumes that the total available RTCP bandwidth remains constant, which it typically does during a session (it is determined during session setup). However, in some situations the total available RTCP bandwidth may change during a session. Some examples are:
  If a handover is performed from one radio technology to another having more severe system limitations, the total available RTCP bandwidth may be reduced. This can happen, for example, in a handover from HSPA to EDGE (Enhanced Data rates for GSM Evolution) or GPRS (General Packet Radio Services).

If the user changes the service. For example, some operators may allocate little bandwidth for RTCP as long as the used service is voice-only. If the user switches to video telephony during the same session, it is desirable to synchronize speech and video (to obtain lip-sync). The required information is sent in RTCP messages and it will be necessary to allocate RTCP bandwidth for both the video stream and the voice stream.

If the system has to cope with such situations, the procedure in FIG. 8 has to loop back all the way to step S1 at least occasionally to account for new operating boundaries, which may change the total available RTCP bandwidth.

Figure 9:
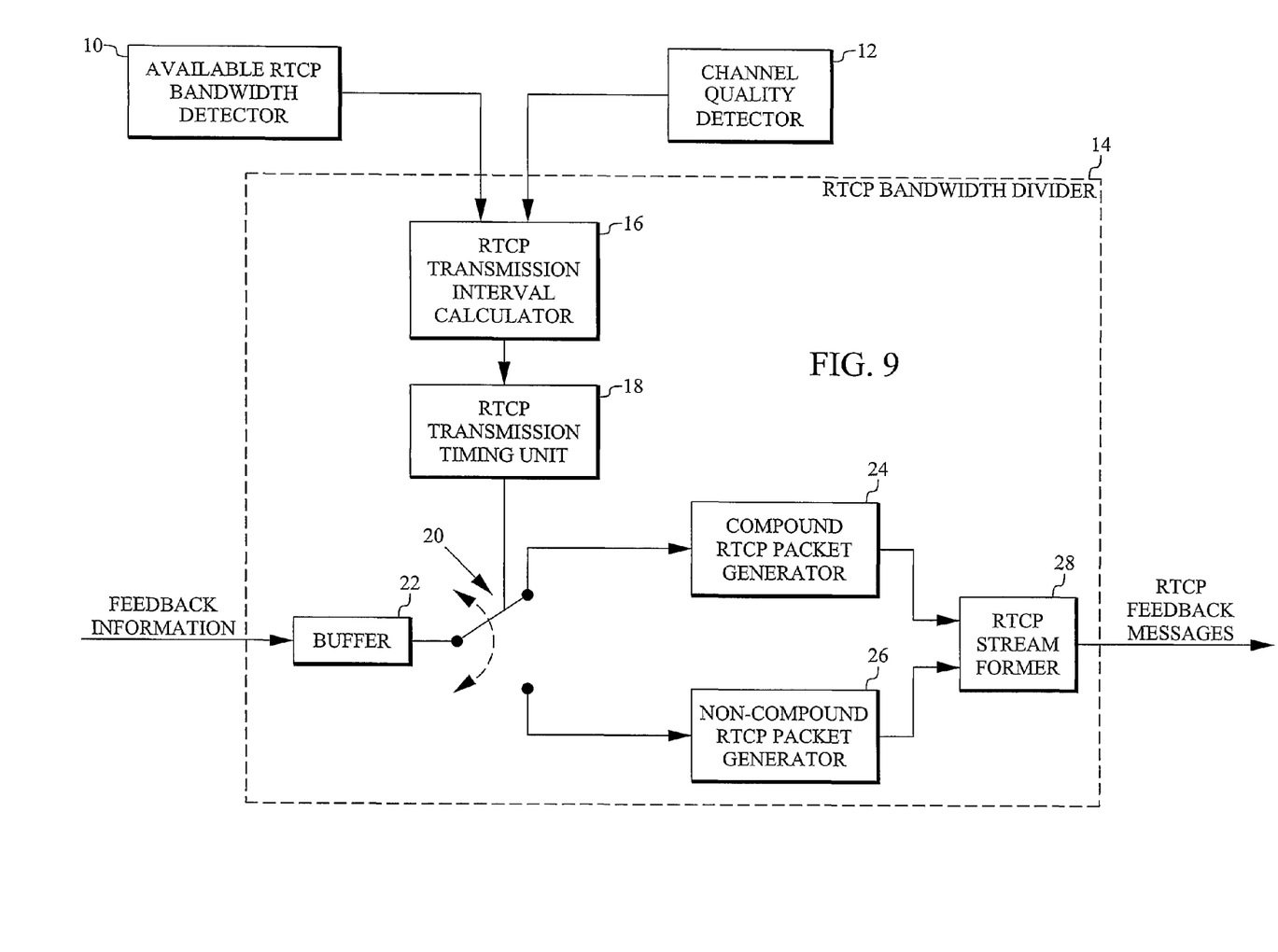
FIG. 9 is a block diagram illustrating an embodiment of the apparatus in accordance with the present invention.

FIG. 9 is a block diagram illustrating an embodiment of the apparatus in accordance with the present invention. The diagram illustrates an embodiment of the RTCP bandwidth divider 14 in FIG. 3 in more detail. The available RTCP bandwidth from detector 10 and current channel quality from detector 12 are forwarded to an RTCP transmission interval calculator 16, which calculates the current transmission intervals for compound and non-compound RTCP packets based on the predetermined transmission interval functions. These transmission intervals are forwarded to an RTCP transmission timing unit 18, which generates a control signal that determines when to transmit the next RTCP packet and whether it should be a compound or non-compound RTCP packet. This control signal controls a switch 20 connected to a buffer 22 holding the feedback information to be sent on the feedback channel. In one switch position the buffer is connected to a compound RTCP packet generator 24, and in the other switch position it is connected to a non-compound RTCP packet generator 26. The output packets from generators 24, 26 are concatenated in an RTCP stream former 28.

Another embodiment determines bandwidth limitations for the respective RTCP packet type, monitors how much bandwidth is used and then decides if the next RTCP packet should be a compound or a non-compound RTCP packet. In general, this embodiment follows the steps outlined below:

1 The RTCP transmitter receives information related to the total available RTCP bandwidth and determines the bandwidth limitations, as a function of channel quality, for the respective RTCP packet types.
2 The RTCP transmitter receives information related to the current channel quality.
3 The RTCP transmitter monitors the size of the transmitted compound and non-compound RTCP packets.
4 The RTCP transmitter stores information about previously transmitted RTCP packets in order to allow calculating how much bandwidth that is used for the respective RTCP packet type.
5 Given the current channel quality, the RTCP transmitter determines how much bandwidth that can be used for compound and non-compound RTCP packets respectively.
6 The RTCP transmitter generates:
   a. a compound RTCP packet if the used bandwidth for compound RTCP packets is less than the currently allowed bandwidth for these packets; or:
   b. a non-compound RTCP packet if the used bandwidth for non-compound RTCP packets is less than the currently allowed bandwidth for these packets; or:
   c. neither a compound nor a non-compound RTCP packets if the used bandwidths exceed the respectively allowed bandwidths.

Figure 10:
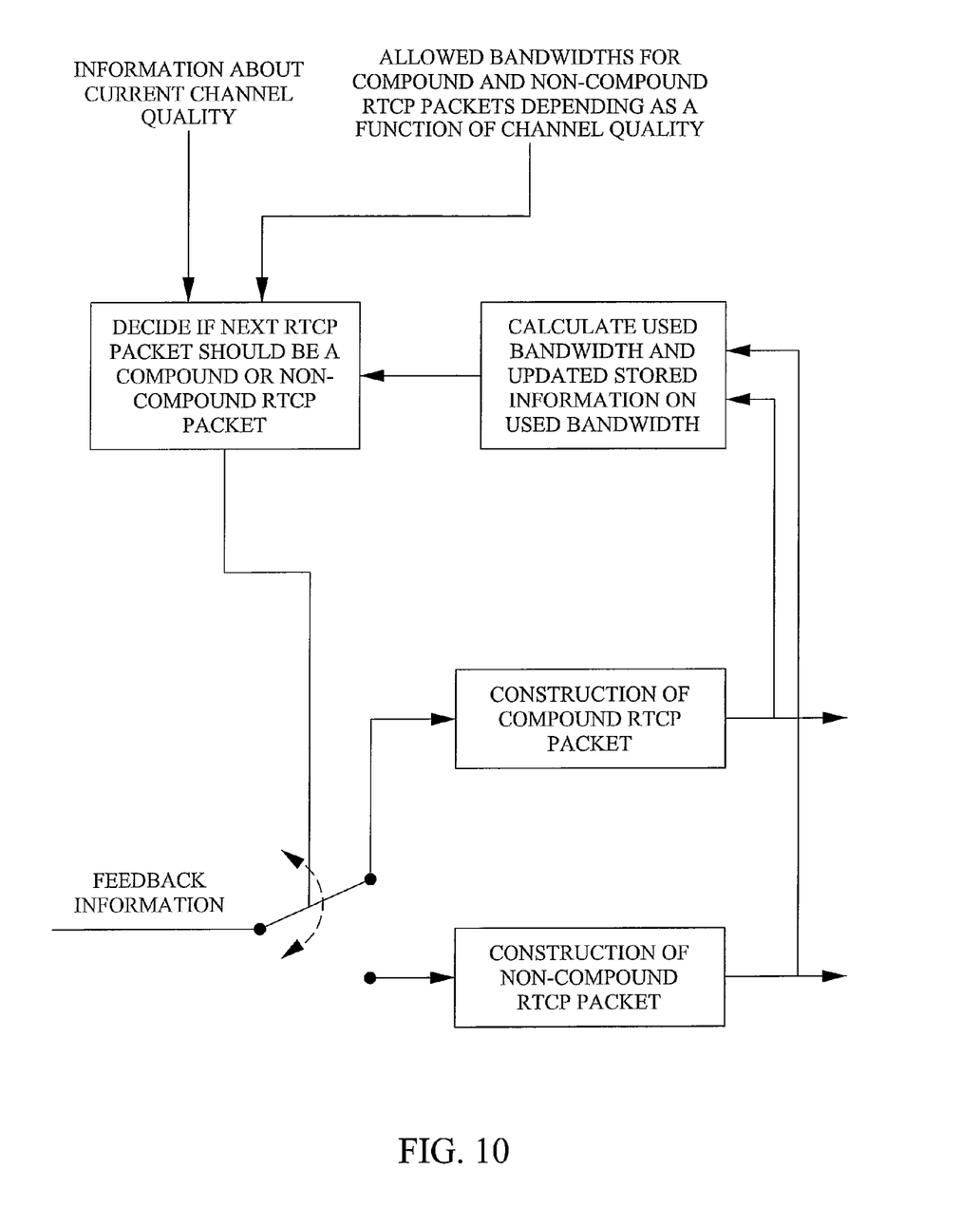
FIG. 10 is schematic overview of another embodiment of the present invention.

A schematic overview of this variant is given in FIG. 10.

Figure 11:
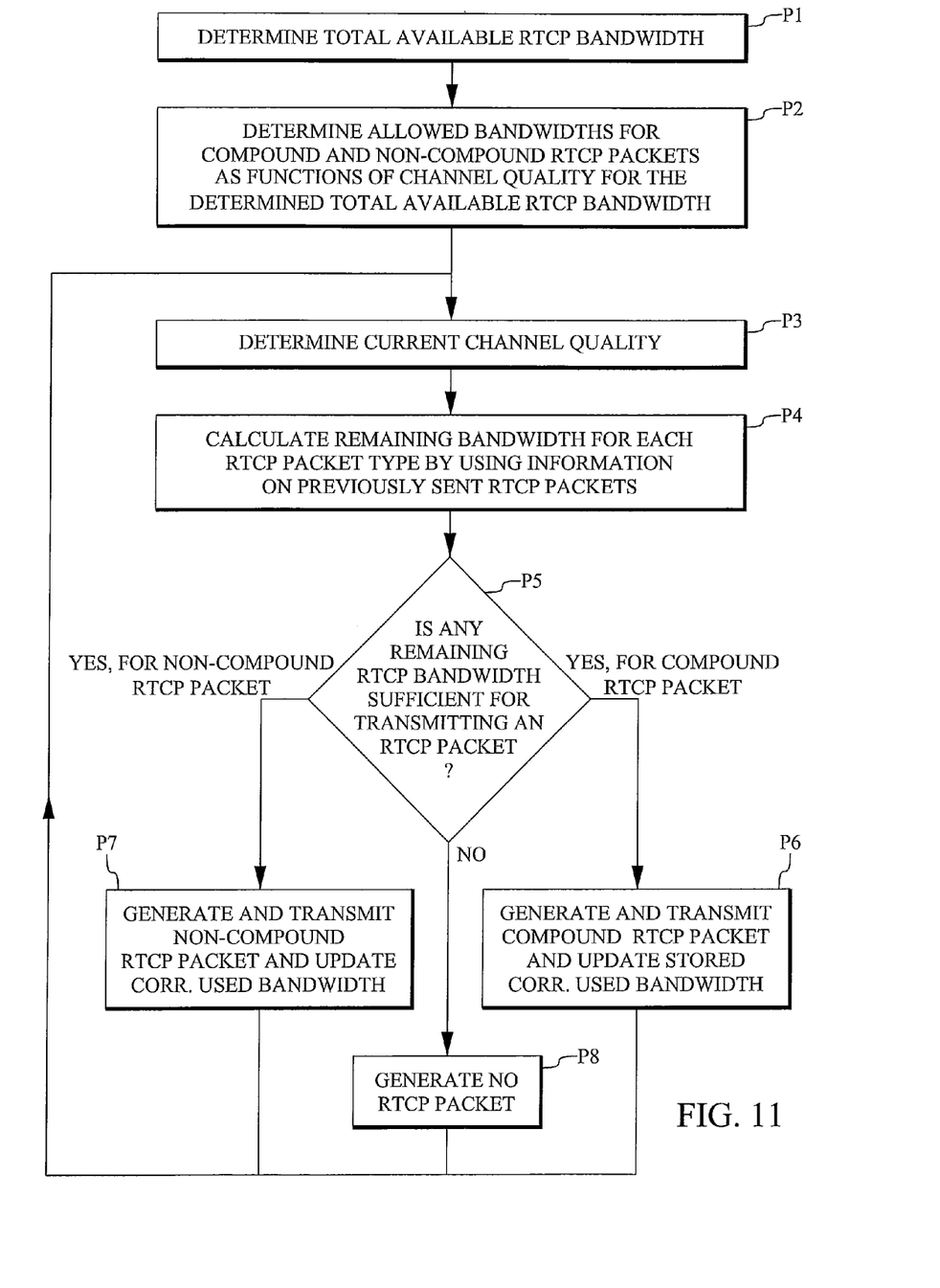
FIG. 11 is a flow chart illustrating another embodiment of the method in accordance with the present invention.

FIG. 11 is a flow chart illustrating the transmission bandwidth function based embodiment of the method in accordance with the present invention. Step P1 determines the total available RTCP bandwidth. This is used to determine the allowed bandwidths of compound and non-compound RTCP packets as functions of channel quality in step P2. The proportions between the allowed bandwidths are typically independent of the total available RTCP bandwidth. However, in some applications it may be desirable to let these proportions depend on the total available RTCP bandwidth. For example, it may be desirable to increase the percentage of allowed bandwidth for compound packets (and decrease the percentage of allowed bandwidth for non-compound RTCP packets) for a high total available RTCP bandwidth as compared to a low total available RTCP bandwidth. Step P3 determines the current channel quality, which is used in step P4 to calculate the remaining bandwidths for each RTCP packet type by using stored information on previously sent RTCP packets of each type. Step P5 tests (using the current remaining transmission bandwidths for each type) whether any of the remaining bandwidths is sufficient for transmitting an RTCP packet of the respective type. First it tests whether there is sufficient available bandwidth to allow sending of a compound RTCP packet. If so, a compound RTCP packet is generated and transmitted in step P6, which also updates the corresponding stored used bandwidth for compound packets. Otherwise it tests whether there is sufficient available bandwidth to allow sending of a non-compound RTCP packet. If so, a non-compound RTCP packet is generated and transmitted in step P7, which also updates the corresponding stored used bandwidth for non-compound packets If neither test is successful, the transmission of packets is delayed and no RTCP packet is generated in step P8. After performing one of steps P6, P7 and P8 the procedure returns to step P3.

If the loop in FIG. 11 is driven by an external clock having a sufficiently long clock cycle that guarantees that there is always sufficient bandwidth for trans-mission of RTCP packets, then step P8 may be omitted.

If the total available RTCP bandwidth is expected to change during a session, the procedure in FIG. 11 will have to loop back to step P1 at least occasionally. See the comments to FIG. 5 above on this subject.

Figure 12:
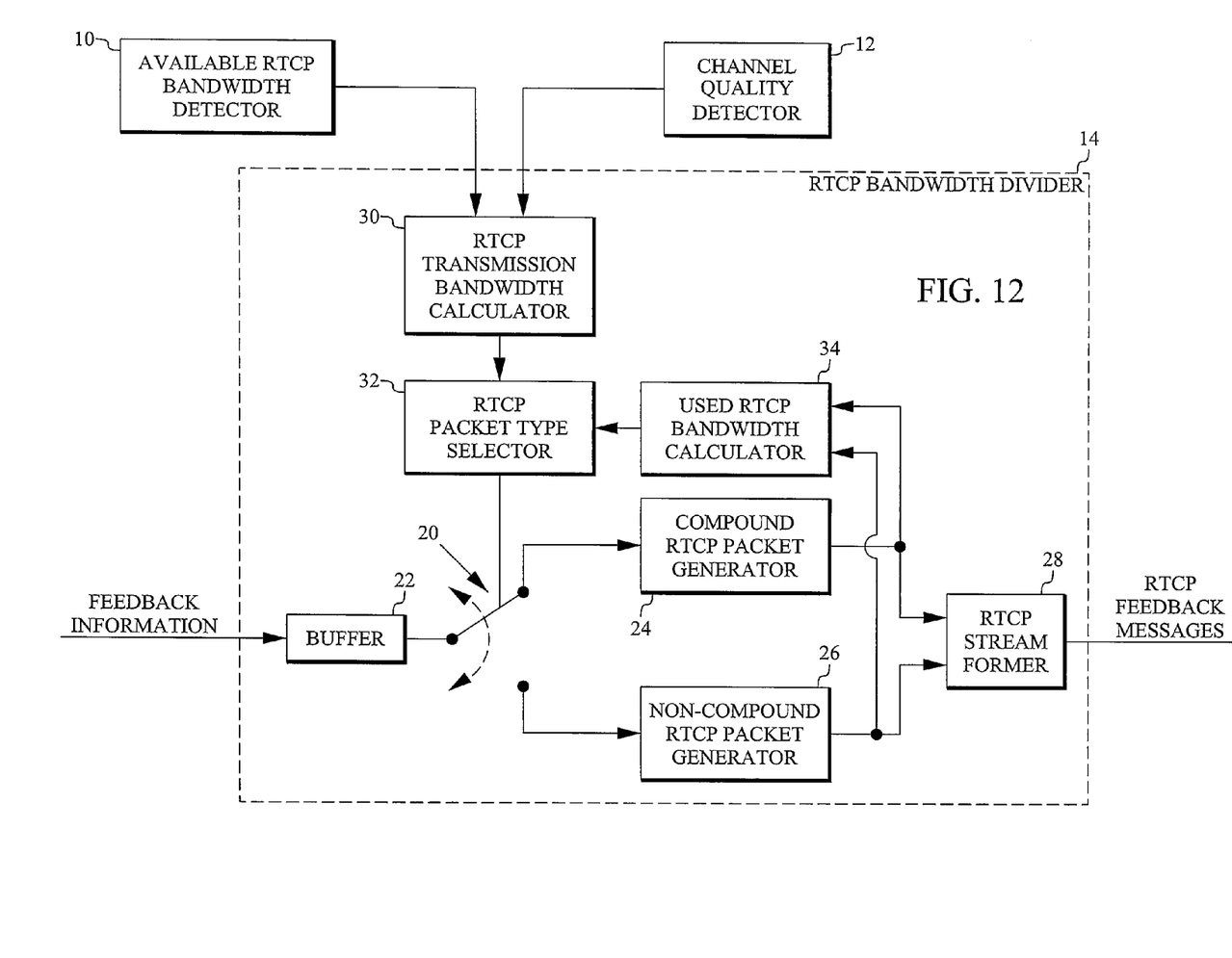
FIG. 12 is a block diagram illustrating another embodiment of the apparatus in accordance with the present invention.

FIG. 12 is a block diagram illustrating another embodiment of the apparatus in accordance with the present invention. The available RTCP bandwidth from detector 10 and current channel quality from detector 12 are forwarded to an RTCP transmission bandwidth calculator 30, which calculates the current allowed transmission bandwidths for compound and non-compound RTCP packets based on the predetermined transmission bandwidth functions. These allowed transmission bandwidths are forwarded to an RTCP packet type selector 32, which decides which packet type should be transmitted next. Selector 32 also receives information on already used RTCP bandwidth for each packet type from a used bandwidth calculator 34 that stores and updates information on already transmitted RTCP packets. The used bandwidth for a packet type can be calculated by tracking the number of bits allocated to that packet type over a specified time period. By using the difference between allowed and used bandwidth for each packet type, selector 32 selects the next packet type to be transmitted and controls switch 20 accordingly. If both packet types have sufficient remaining bandwidth to allow sending of another packet, higher priority may be given to one of them. For example, bandwidth for compound RTCP packets may be consumed first.

The embodiments described above may be modified in different ways, for example:

Instead of determining transmission intervals for both compound and non-compound RTCP packets it is possible to determine either one of them (compound or non-compound) and use the rest for the other packet type (non-compound and compound respectively). One of course has to monitor the used bandwidth so that the bandwidth limitations defined at session setup are not violated.

Instead of monitoring the used bandwidth of both compound and non-compound RTCP packets it is possible to monitor the used bandwidth for one of them (compound or non-compound) and use the rest of the allowed bandwidth for the other RTCP packet type (non-compound and compound respectively).

The functionality of the various blocks in the described embodiments is typically obtained by one or more micro processors or micro/signal processor combinations and corresponding software.

The present invention has several advantages, some of which are:

Good synchronization between media is maintained when channel conditions are good. The delay before a media sender is identified is kept short when the channel conditions are good.

The adaptation performance is improved for degraded channel conditions, i.e. when the most important problem is to maintain good media quality.

It is possible to optimize the performance for different channel conditions.

It will be understood by those skilled in the art that various modifications and changes may be made to the present invention without departure from the scope thereof, which is defined by the appended claims.

ABBREVIATIONS

AMR Adaptive Multi-Rate
APP Application specific RTCP packets
C/I Channel-to-Interference ratio
C/N Channel-to-Noise ratio
CQI Channel Quality Indicator
EDGE Enhanced Data rates for GSM Evolution
GPRS General Packet Radio Services
HSPA High-Speed Packet Access
IP Internet Protocol
IETF Internet Engineering Task Force
IMS IP Multimedia Subsystem
MTSI Multimedia Telephony Service for IMS
PLR Packet Loss Rate
RLC Radio Link Protocol
RR Receiver Report
RTCP Real-Time Control Protocol
RTP Real-Time Protocol
SDES Source Description
SR Sender Report
VoIP Voice over IP

REFERENCES

[1] RFC 3550, Schulzrinne, et. al., RTP: A Transport Protocol for Real-Time Applications, http://www.ietf.org/rfc/rfc3550.txt?number=3550
[2] Johansson, Westerlund, Support for non-compound RTCP in RTCP AVPF profile, opportunities and consequences, http://tools.ietf.org/id/draft-johansson-avt-rtcp-avpf-non-compound-00.txt
[3] 3GPP TS 26.114. IP Multimedia Subsystem (IMS); Multimedia Telephony; Media handling and interaction, http://www.3gpp.org/ftp/Specs/html-info/26114.htm

The invention claimed is:

1. A method of controlling utilization of RTCP bandwidth for compound and non-compound Real-Time Transport Control Protocol (RTCP) packets, including the steps of
determining available RTCP bandwidth;
determining channel quality;
dividing the available RTCP bandwidth between compound and noncompound RTCP packets based on the determined channel quality.

2. The method of claim 1, including the step of allocating increased allowed bandwidth to compound RTCP packets with improving channel quality.

3. The method of claim 1, including the step of allocating decreased allowed bandwidth to non-compound RTCP packets with improving channel quality.

4. The method of claim 2, including the step of generating compound RTCP packets at a first transmission interval and non-compound RTCP packets at a second transmission interval, said first and second transmission intervals depending on the determined available RTCP bandwidth and the determined channel quality.

5. The method of claim 2, including the step of generating compound RTCP packets at a first rate and non-compound RTCP packets at a second rate, said first and second rates depending on the determined available RTCP bandwidth and the determined channel quality.

6. An apparatus for controlling utilization of Real-Time Transport Control Protocol (RTCP) for compound and non-compound RTCP packets, said apparatus including:
a bandwidth detector configured to determine available RTCP bandwidth;
a channel quality detector configured to determine channel quality;
a bandwidth divider connected to the bandwidth detector and the channel quality detector, said bandwidth divider being configured to divide the available RTCP bandwidth between compound and non-compound RTCP packets based on the determined channel quality.

7. The apparatus of claim 6, wherein the bandwidth detector is configured to increase the bandwidth allocated to compound RTCP packets with improving channel conditions.

8. The apparatus of claim 6, wherein the bandwidth detector is configured to decrease the bandwidth allocated to non-compound RTCP packets with improving channel conditions.

9. The apparatus of claim 7, including means for generating compound RTCP packets at a first transmission interval and noncompound RTCP packets at a second transmission interval, said first and second transmission intervals depending on the determined available RTCP bandwidth and the determined channel quality.

10. The apparatus of claim 7, including means for generating compound RTCP packets at a first rate and non-compound RTCP packets at a second rate, said first and second rates depending on the determined available RTCP bandwidth and the determined channel quality.

* * * * *

UNITED STATES PATENT AND TRADEMARK OFFICE
CERTIFICATE OF CORRECTION

| | | |
|---|---|---|
| PATENT NO. | : 8,189,616 B2 | Page 1 of 1 |
| APPLICATION NO. | : 12/523676 | |
| DATED | : May 29, 2012 | |
| INVENTOR(S) | : Frankkila | |

It is certified that error appears in the above-identified patent and that said Letters Patent is hereby corrected as shown below:

In The Specification

In Column 8, Line 29, delete "packets" and insert -- packets. --, therefor.

In Column 8, Line 35, delete "trans-mission" and insert -- transmission --, therefor.

In The Claims

In Column 10, Line 8, in Claim 1, delete "of" and insert -- of: --, therefor.

Signed and Sealed this
Twenty-sixth Day of April, 2016

Michelle K. Lee
*Director of the United States Patent and Trademark Office*